United States Patent [19]

Eicke et al.

[11] 3,887,598
[45] June 3, 1975

[54] PROCESS FOR THE MANUFACTURE OF METAL COMPLEXES IN A PURE FORM

[75] Inventors: Hans Eicke, Reinach; Vladimir Arnold, Basel; Francois L'Eplattenier, Therwil, all of Switzerland

[73] Assignee: Ciba-Geigy Corporation, Ardsley, N.Y.

[22] Filed: Nov. 8, 1973

[21] Appl. No.: 413,994

[30] Foreign Application Priority Data

Nov. 22, 1972 Switzerland.................... 17009/72

[52] U.S. Cl............... 260/429 R; 44/68; 44/DIG. 2; 252/518; 252/519; 252/520; 252/521; 260/45.75 R; 260/45.75 N; 260/429 J; 260/429.2; 260/429.3; 260/438.5; 260/439 R; 260/447; 260/448 B

[51] Int. Cl................... C07f 5/00; C07f 5/06

[58] Field of Search............ 260/448 B, 429.2, 447, 260/439 R, 429.3, 429 R, 429.5

[56] References Cited

UNITED STATES PATENTS

| | | | |
|---|---|---|---|
| 1,933,520 | 10/1933 | Bruson..................................... | 134/57 |
| 3,624,116 | 11/1971 | Ward................................ | 260/439 R |
| 3,627,798 | 12/1971 | Ward................................ | 260/439 R |
| 3,751,440 | 8/1973 | Spivack............................ | 260/439 R |

OTHER PUBLICATIONS

Beilstein, Handbuch der Org. Chem., Vol. 10, II series, pp. 32–39.
Alcazar et al., Chem. Abstracts 31 Col. 7199.
Kapoor et al., J. Am. Chem. Soc. 82 (1960), pp. 3495–8.

Primary Examiner—Arthur P. Demers
Attorney, Agent, or Firm—Charles W. Vanecek; Nestor W. Shust

[57] ABSTRACT

A new process for preparing metal complexes of unsubstituted or 3,5-substituted salicylic acid and of 3- or 4-valent metals comprising reacting a corresponding salicylic acid with a soluble metal salt and an alkali alcoholate.

4 Claims, No Drawings

PROCESS FOR THE MANUFACTURE OF METAL COMPLEXES IN A PURE FORM

The present invention relates to a process for the manufacture of metal complexes of trivalent or tetravalent metals with acids of the formula I

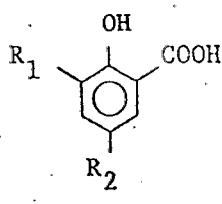

in which $R_1$ and $R_2$ independently of one another denote hydrogen, bromine, chlorine, alkyl, cycloalkyl or aralkyl, which is characterised in that a successive reaction is carried out, in a solvent, of
 a. an acid of the formula I with
 b. a salt of the formula II

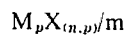

(II)

in which M denotes the cation of a trivalent or tetravalent metal, X denotes an anion which forms with M a salt which is soluble in the solvent of the process and $p$ denotes 1, 2 or 3, and $m$ corresponds to the valency of the anion X and $n$ to the valency of the metal M and
 c. an alcoholate of the formula III

M'OR (III)

in which M' denotes the cation of an alkali metal and R denotes lower alkyl, the methoxyethyl group or the ethoxyethyl group, $a$, $b$ and $c$ are employed in the molar ratio of $(n-i):l/p:n$, and $i$ denotes 1 or 0 and, in the case that $i$ is 1, the reaction mixture is reacted with water, the molar ratio of water to the acid of the formula I being at least $1:(n-1)$.

By metal complexes there are understood, in the present invention, either complexes of a metal M and anions of the acid of the formula I or of a metal M, anions of the acid of the formula I and a hydroxyl group.

It is already known to manufacture metal complex mixtures of some trivalent and tetravalent metals with the acids of the formula I. In these processes, the alcoholates of the trivalent or tetravalent metals in question are reacted with the acids of the formula I. The manufacture in the pure form of the metal complexes of these trivalent and tetravalent metals with the acids of the formula I was not possible by this method.

It has now been found, surprisingly, that in the reaction of acids of the formula I with $l/p$ mols of salts of the formula II and subsequently with $n$ mols of alkali metal alcoholates of the formula III, pure metal complexes which are a single substance are obtained.

The process according to the invention is not only novel but also offers the technical advantage that the previously necessary manufacture of the alcoholates of the trivalent or tetravalent metals is superfluous.

The pure metal complexes obtained according to the process of the invention, which are used as antistatic agents, are more active than the previously known metal complex mixtures.

In a preferred embodiment of the process according to the invention, a reaction is carried out in a lower alcohol, a lower ether, a lower ether-alcohol, a lower ketone or dimethylformamide of
 a. an acid of the formula I with
 b. a salt of the formula II

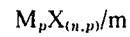

(II)

in which M denotes the trivalent cation of Cr, Co, Fe, Al, Ga, In or Bi or of a lanthanide or the tetravalent cation of Zr, X denotes the anion $Cl^-$, $Br^-$, $F^-$, $NO_3^-$, $SO_4^{--}$ or $ClO_4^-$ and $p$ denotes 1 or 2 and m corresponds to the valency of the anion X and $n$ to the valency of the cation M and
 c. an alcoholate of the formula III

M'OR (III)

in which M' denotes the cation of an alkali metal and R denotes lower alkyl, the methoxyethyl group or the ethoxyethyl group, $a$, $b$ and $c$ are employed in the molar ratio of $(n-i):l/p:n$ and $i$ denotes 1 or 0 and, if $i$ is 1, the reaction mixture is reacted with water, the molar ratio of water to the acid of the formula I being at least $1:(n-1)$.

The acids of the formula I used in the process according to the invention can be substituted in position 3 and/or 5 by alkyl groups which contain, for example, a total of 1 to 10, preferably 1 to 8, carbon atoms, such as methyl, ethyl, n-propyl, iso-propyl, n-butyl, sec.-butyl, tert.butyl, tert.amyl, n-pentyl, hexyl, tert.octyl, n-octyl or decyl, by cycloalkyl groups which preferably contain 6 to 9 carbon atoms, such as cyclohexyl or 1-methylcyclohexyl, or by aralkyl groups with, preferably, 7 to 9 carbon atoms, such as benzyl, α-methylbenzyl or α,α-dimethylbenzyl.

Examples of salts of the formula II which are used are salts of the trivalent metals Cr, Co, Fe, Al, Ga, In or Bi or of a lanthanide or of tetravalent Zr and the acids HCl, HBr, $HNO_3$, $H_2SO_4$, $HClO_4$, $CH_3COOH$ and $C_{17}H_{35}COOH$. Preferably, salts of the formula II, according to the invention, of the trivalent metals Cr, Co, Fe, Al, Ga, In or Bi or of tetravalent Zr, and especially preferentially of Cr, Co, Fe, Al or Zr, and of the acids HCl, $HNO_3$ or $H_2SO_4$, and particularly preferentially HCl, are used.

Amongst the alcoholates of the formula III, sodium alcoholates and potassium alcoholates are preferred. When the group R of the alcoholates of the formula III denotes lower alkyl, it can be lower alkyl with 1 to 4 carbon atoms, such as methyl, ethyl, propyl or butyl.

The solvents used in the process according to the invention can be lower alcohols, preferably with 1 to 4 carbon atoms, such as, for example, methanol, ethanol, iso-propanol, butanol or glycol; lower ethers, preferably with 2 to 6 carbon atoms, such as, for example, open-chain ethers such as dimethyl ether, diethyl ether, diisopropyl ether, 1,2-dimethoxyethane, diethylene glycol dimethyl ether or diethylene glycol monoethyl ether, or cyclic ethers such as tetrahydrofurane or dioxane; lower ether-alcohols with, preferably, 3 to 6 carbon atoms, such as, for example, methylcellosolve, ethylcellosolve or ethylcarbitol; or lower ketones with, preferably, 3 to 6 carbon atoms, such as, for example, acetone, methyl ethyl ketone, diethyl ketone or methyl isopropyl ketone.

The preferred solvents of the process according to the invention are lower alcohols, and methanol and ethanol are particularly preferred. The process according to the invention is preferably carried out at temperatures below 110°C.

In the process according to the invention, after adding the salts of the formula II and the alcoholates of the formula III, water is added if the molar ratio of the acid of the formula I to the alcoholate of the formula III is not 1 but ⅔ or ¾. The molar ratio of water to the acid of the formula I should in that case be at least 1:(n-1), wherein $n$ is the valency of the metal. However, as large an excess of water over this minimum amount as may be desired can also be used. The reaction with water produces monohydroxy complexes which consist of a cation of a metal M, (n-1) anions of an acid of the formula I and a hydroxyl group.

In the process according to the invention, the absolute concentration is not critical. The only limit imposed on it is that due to the solubility of the reactants.

The compounds which can be manufactured according to the invention are in some cases new. New metal complexes are the complexes which are produced from a salt of the formula II in which M denotes the trivalent cation of Ga, In or Bi or the tetravalent cation of Zr, such as, for example

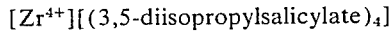

The compounds which can be manufactured according to the invention are used as antistatic agents for hydrocarbons such as, for example, alkanes such as pentane or hexane, cycloalkanes such as cyclohexane, aromatic hydrocarbons such as benzene or toluene or halogenated hydrocarbons such as $CCl_4$ or $CHCl_3$ or mixtures of these hydrocarbons. Their use as antistatic agents for liquid fuels, such as petrol and kerosene, and for mineral oils, is of particular industrial interest. The compounds are added to the substrates in concentrations of $10^{-2}$ to $10^{-6}$ mol/litre, preferably $10^{-3}$ to $10^{-4}$ mol/litre.

The compounds which can be manufactured according to the invention can also be used as PVC stabilisers, polymerisation catalysts or driers.

In the examples which follow, per cent (%) denotes per cent by weight and "DIPS" denotes the anion of diisopropyl salicylic acid,

EXAMPLE 1

Preparation of Al(DIPS)₃

6.67 g of 3,5-diisopropylsalicylic acid ($3.10^{-2}$ mol) are dissolved in 75 ml of analytical grade methanol. 1.33 g of AlCl₃ ($10^{-2}$ mol) dissolved in 75 ml of methanol are added thereto. 300 ml of 0.1 N sodium methylate solution in methanol ($3×10^{-2}$ mol) are subsequently added in portions, whilst stirring. The methanol is evaporated off and the residue is dissolved in 300 ml of benzene and cooled for 20 minutes at 0°C. The NaCl is filtered off and the benzene is evaporated off. The residue is dissolved in 100 ml of ether, the ether is distilled off on a rotary evaporator and the residue is dried at 95°C.

| Gravimetric analysis: | Found | 3.91% |
|---|---|---|
|  | Calculated | 3.91% |

If the AlCl₃ is replaced by $10^{-2}$ mol of FeCl₃, InCl₃ or GaCl₃ and in other respects the procedure described above is followed, the corresponding metal complexes of diisopropylsalicylic acid are obtained. The gravimetric analyses give the following values for the corresponding metals.

|  | M, calculated (%) | M, found (%) |
|---|---|---|
| Fe complex | 7.77 | 7.84 |
| In complex | 14.75 | 14.64 |
| Ga complex | 9.5 | 9.26 |

EXAMPLE 2

If in Example 1 the diisopropylsalicylic acid is replaced by $3×10^{-2}$ mol of 3-butylsalicylic acid, 3-methylsalicylic acid or salicylic acid, the corresponding aluminium complexes are obtained.

EXAMPLE 3

Preparation of Zr(DIPS)₄

8.89 g of 3,5-diisopropylsalicylic acid ($4×10^{-2}$ mol) are dissolved in 75 ml of analytical grade methanol. 2.33 g of ZrCl₄ ($10^{-2}$ mol) dissolved in 75 ml of methanol are added thereto. Thereafter, 400 ml of 0.1 N sodium methylate solution in methanol ($4×10^{-2}$ mol) are added in portions whilst stirring. The methanol is evaporated off and the residue is dissolved in 300 ml of benzene and cooled for 20 minutes at 0°C. The NaCl is filtered off and the benzene is evaporated off. The residue is dissolved in 100 ml of ether, the ether is evaporated off on a rotary evaporator and the residue is dried at 95°C.

| Gravimetric analysis: | Found | Zr 10,00% |
|---|---|---|
|  | Calculated | 9.34% |

EXAMPLE 4

Preparation of Al(DIPS)₂(OH)

4.45 g of 3,5-diisopropylsalicylic acid ($2×10^{-2}$ mol) are dissolved in 75 ml of analytical grade methanol. 1.33 g of AlCl₃ ($10^{-2}$ mol) dissolved in 75 ml of methanol are added thereto. 300 ml of 0.1 N sodium methylate solution in methanol ($3×10^{-2}$ mol) are then added in portions, whilst stirring. The methanol is evaporated until the total solution volume has been reduced to approx. 1/6 and the residue is mixed with 300 ml of distilled water. The aqueous suspension is extracted with 300 ml of benzene. The benzene phase is separated off and subsequently washed twice with 150 ml of distilled water at a time. After separating off the water, the benzene phase is dried with sodium sulphate and filtered off. The benzene is evaporated off. The residue is dissolved in ether, evaporated to dryness on a rotary evaporator and dried at 95°C.

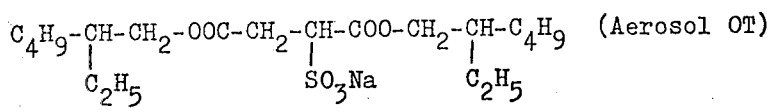 (Aerosol OT)

| Gravimetric analysis: | Found | Al 5.56% |
| --- | --- | --- |
| | Calculated | 5.55% |

(Aerosol OT) in benzene were prepared under the concentration conditions indicated in the table which follows. The specific conductivities (H[$\Omega^{-1}$cm$^{-1}$]) of the solutions were determined at +20 ± 0.01°C.

| Al(DIPS)$_3$ (Mol. litre$^{-1}$) | | | Aerosol OT (Mol.litre$^{-1}$) | | |
| --- | --- | --- | --- | --- | --- |
| | $10^{-5}$ | $10^{-6}$ | $10^{-7}$ | $10^{-8}$ | 0 |
| $10^{-3}$ | 4.54×10$^{-10}$ | 4.53×10$^{-11}$ | 6.45×10$^{-12}$ | 4.87×10$^{-12}$ | 4.7×10$^{-12}$ |
| $10^{-4}$ | 4.7×10$^{-11}$ | 3.64×10$^{-11}$ | 1.29×10$^{-12}$ | 3.05×10$^{-12}$ | 2.94×10$^{-12}$ |
| $10^{-5}$ | 1.88×10$^{-11}$ | 1.76×10$^{-11}$ | 2.23×10$^{-12}$ | 2.26×10$^{-12}$ | 1.08×10$^{-12}$ |
| 0 | 6.15×10$^{-14}$ | 5.05×10$^{-15}$ | | | |

If, in the preceding example, AlCl$_3$ is replaced by 10$^{-2}$ mol of BiCl$_3$ and in other respects the procedure described is followed, the corresponding bismuth complex is obtained.

| Gravimetric analysis: | Found | Bi 30.0% |
| --- | --- | --- |
| | Calculated | 31.3% |

EXAMPLE 5

Preparation of Cr(DIPS)$_3$ 6.67 g of 3,5-diisopropylsalicylic acid (3×10$^{-2}$ mol) are dissolved in 75 ml of analytical grade methanol. 2.67 g of CrCl$_3$.6H$_2$O (10$^{-2}$ mol) dissolved in 75 ml of methanol are added thereto. Thereafter, 300 ml of 0.1 N sodium methylate solution in methanol (3×10$^{-2}$ mol) are added in portions whilst stirring. The methanol is evaporated off and the residue is dissolved in 300 ml of benzene and cooled for 20 minutes at 0°C. The NaCl is filtered off and the benzene is evaporated off. The residue is dissolved in 100 ml of ether, the ether is distilled off on a rotary evaporator and the residue is dried at 95°C.

| Gravimetric analysis: | Found | Cr 7.34% |
| --- | --- | --- |
| | Calculated | 7.27% |

EXAMPLE 6

Preparation of Al(3,5-di-tert.butylsalicylate)$_3$ 7.52 g of 3,5-di-tert.butylsalicylic acid (3×10$^{-2}$ mol) are dissolved in 75 ml of analytical grade methanol. 1.33 g of AlCl$_3$ (10$^{-2}$ mol) dissolved in 75 mol of methanol are added thereto. 300 ml of 0.1 N sodium methylate solution in methanol (3×10$^{-2}$ mol) are subsequently added in portions, whilst stirring. The methanol is evaporated off and the residue is dissolved in 300 ml of benzene and cooled for 20 minutes at 0°C. The NaCl is filtered off and the benzene is evaporated off. The residue is dissolved in 100 ml of ether, the ether is distilled off on a rotary evaporator and the residue is dried at 95°C.

| Gravimetric analysis | Found | Al 3.46% |
| --- | --- | --- |
| | Calculated | 3.48% |

EXAMPLE 7

Binary mixtures of Al(DIPS)$_3$ and

What is claimed is:

1. Process for the manufacture of metal complexes of trivalent or tetravalent metals with acids of the formula I

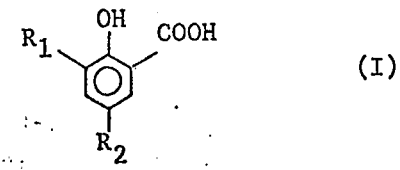 (I)

in which R$_1$ and R$_2$ independently of one another denote hydrogen, bromine, chlorine, alkyl, cycloalkyl or aralkyl, which is characterised in that a successive reaction is carried out, in a solvent, of
  a. an acid of the formula I with
  b. a salt of the formula II

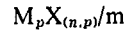 (II)

in which M denotes the cation of a trivalent or tetravalent metal, X denotes an anion which forms with M a salt which is soluble in the solvent of the process and $p$ denotes 1, 2 or 3 and $m$ corresponds to the valency of the anion X and $n$ to the valency of the metal M and
  c. an alcoholate of the formula III

 (III)

in which M' denotes the cation of an alkali metal and R denotes lower alkyl, the methoxyethyl group or the ethoxyethyl group, $a$, $b$ and $c$ are employed in the molar ratio of (n-i):l/p:n, and $i$ denotes 1 or 0 and, in the case that $i$ is 1; the reaction mixture is reacted with water, the molar ratio of water to the acid of the formula I being at least 1:(n-1).

2. Process according to claim 1, characterised in that a successive reaction is carried out, in a lower alcohol, a lower ether, a lower ether-alcohol, a lower ketone or dimethylformamide, of
  a. an acid of the formula I with
  b. a salt of the formula II $$M_p X_{(n-p)} m \quad \text{(II)}$$

in which M denotes the trivalent cation of Cr, Co, Fe, Al, Ga, In or Bi or of a lanthanide or the tetravalent cation of Zr, X denotes the anion $Cl^-$, $Br^-$, $F^-$, $NO_3^-$, $SO_4^{--}$ or $ClO_4^-$ and $p$ denotes 1 or 2 and $m$ corresponds to the valency of the anion X and $n$ to the valency of the cation M and c. an alcoholate of the formula III $$M'OR \quad \text{(III)}$$

in which M′ denotes the cation of an alkali metal and R denotes lower alkyl, the methoxyethyl group or the ethoxyethyl group, $a$, $b$ and $c$ are employed in the molar ratio of $(n-i):1/p:n$ and $i$ denotes 1 or 0 and, if $i$ is 1, the reaction mixture is reacted with water, the molar ratio of water to the acid of the formula I being at least $1:(n-1)$.

3. Process according to claim 1, characterised in that an acid of the formula I is used, in which $R_1$ and $R_2$ independently of one another denote hydrogen, alkyl with a total of 1 to 10 carbon atoms, cycloalkyl with 6 to 9 carbon atoms or aralkyl with 7 to 9 carbon atoms.

4. Process according to claim 1, characterised in that a salt of the formula II in which X denotes $Cl^-$ is used.

* * * * *